United States Patent Office 3,629,401
Patented Dec. 21, 1971

3,629,401
ANTI-INFLAMMATORY MEDICINAL
PREPARATION
David R. Foster, 1409 Gieffers St.,
Lake Charles, La. 70601
No Drawing. Filed Oct. 3, 1969, Ser. No. 863,703
Int. Cl. A61k 27/00
U.S. Cl. 424—95                                   6 Claims

ABSTRACT OF THE DISCLOSURE

This disclosure relates to the discovery of a medicinal preparation extracted from invertebrates of the Annelida phylum by cooking a sealed, glass container of specimen in boiling water for approximately 30 minutes, cooling slightly, and separating the cooked liquid extract by straining. The preparation was found to have an excellent anti-inflammatory effect and is used topically to relieve the symptoms of arthritis and rheumatism and skin irritations such as poison ivy. In severe cases, arthritic symptoms have been alleviated for approximately three weeks while in cases treated prior to bone tissue damage the symptoms have been alleviated for longer periods of time. The preparation has also been used as a skin lotion and is applied drop wise to an affected area and massaged gently into the surface of the skin.

---

Rheumatoid arthritis, a common variety of joint inflammation, affects young and middle aged persons. Another disabling form of this disease, osteoarthritis, is a common degenerative joint disorder in elderly people. Although these and other less common forms of arthritis afflict several million people in this country and the annual cost of treatment, care and losses in time, money and productivity are incalculable, a satisfactory cure or treatment for the disease has not been forthcoming.

The onset of rheumatoid arthritis has been attributed to hyposensitivity, protein derangements, endocrine imbalances, and psychic disturbances. These factors in various studies have led to the assumption that this systemic disease is ushered in by some physical or emotional stress.

The disease typically attacks the joints in the fingers first; then joints of the hands, wrists, feet and other smaller joints progressively become affected. Joint destruction is common with advancing disease. Osteoarthritis is marked by a progressive stiffness, loss of function, and destruction of the larger, weight bearing joints of the body.

A break through in treatment came in 1948 when P. S. Hench and his associates discovered the beneficial effect of cortisone on the inflammatory and allergic reactions in rheumatoid arthritis and other colagen diseases. They demonstrated that hormones of the adrenal cortex exert a profound effect not only on intermediate metabolism, but on hot resistance and reaction to the disease as well.

However, steroids such as cortisone have several undesirable side effects. If cortisone is used in excess it increases the formation of glucose and glycogen from nonglucose matter. This, in turn, may cause a diabetic state further complicated by a moderate anti-insulin effect described as an insulin blocking action at the periphery of the cell. Other undesirable side effects of cortisone include a hematologic activity wherein there is a lowering of the circulating blood cells.

Prolonged administration of the cortisone may cause polyeythemia, a disease due to excessive production of red corpuscles in fhe blood, and an increase in the secretion of hydrochloric acid in the stomach. In addition, an increased excitability of the central nervous system following administration of cortisone has been reported.

Accordingly, although steroids such as cortisone are a treatment for the disease, the undesirable side effects and cost of the drug have stimulated further research directed toward a low cost cure or treatment which in fact will ease the joint stiffness, swelling and pain associated with the inflammation in those afflicted without the undesirable side effects, and the necessity for constant physician supervision during treatment.

It has been discovered that invertebrates of the phylum Annelida, and specifically, of the order, Oligochaeta within the said phylum yield a medicinal extract which has therapeutic and beneficial result when topically administrated to an area afflicted with an arthritic disorder.

Phenomenal results have been observed in patients having mild to moderate, and severe arthritic inflammations.

Accordingly, it is an object of this invention to provide a therapeutic medicinal preparation having an anti-inflammatory effect.

It is another object to provide a medicinal balm for topical application to an afflicted area which alleviates the inflammatory symptoms of arthritis and rheumatism, and allergic skin irritations without undesirable systemic side effects.

It is a further object to provide a medicinal liquid extracted from invertebrates of the Annelida phylum which will reduce the inflammation and associated joint stiffness and pain in severe cases of arthritis and eliminate the said symptoms in moderate cases which will act quickly and effectively without undesirable side effects.

It is yet another object to provide a method of preparing a medicinal balm for external application to treat inflammations of the body which is relatively simple, quick and inexpensive.

These and other objects will become readily apparent with reference to the following description.

The medicinal preparation of this invention comprises an extract prepared from invertebrates of the Annelida phylum. This phylum includes the order Oligochaeta which is broadly comprised of fresh water and burrowing terrestial animals. They are cylindrical, elongated, segmented animals having an anterior mouth and a posterior anus. They are pictured as a tube within a tube wherein the segments are marked by external furrows. The most familiar member of the class is Lumbricus, the earth worm. Specimens of this family are preferred for use in the preparation of this invention. These specimen inhibit fertile soil which is ingested as they burrow. They derive their nutrition from the organic content of the soil through which they burrow.

In order to extract the medicinal preparation of this invention, fresh water or burrowing Annelids are collected with Lumbricidae being preferred. The particular geographical area from which the specimen are collected does not appear to be determinative of the properties found in the extract. Extracts of specimen collected from widely separated geographical areas of the United States have been found to have identical properties.

Following collection of the specimen, they are washed in cool water and placed while alive in a glass vessel. The quantity used per batch may vary, however, one quarter to one half pound of specimen in a quart container presents a batch size which is easily handled.

The sealed container is placed in a boiling water bath for a cooking time of 30 minutes for each one quarter pound of Annelids. It was observed that approximately ten pounds per square inch of pressure was developed within the sealed container during the cooking process.

As the Annelids cook they become hard and brittle and a watery brown liquid collects in the container. After the cooking process is complete, the container is removed from the water bath and allowed to cool for approximately 15 minutes until it may be handled.

After the container has cooled a sufficient amount to permit handling, it is opened and the contents strained to separate the extracted liquid. A conventional cheese cloth was used as a strainer, but any sieve-like material may also be used, provided the mesh is sufficiently fine to retain the solids in the mixture.

The liquid extract must then be refrigerated. It has been discovered that the liquid will spoil if stored at room temperature, however, it will keep indefinitely at a temperature of from 45 to 50° F.

The liquid extract is administrated in the following manner. Two drops are applied topically to the afflicted area and gently rubbed and massaged into the skin until the area is dry to the touch. The liquid may also be mixed with an inert vehicle such as a dry hand cream if a cream is preferred rather than a liquid. The size of the dose administrated will vary with the size of the area to be covered, however, two drops are sufficient in most instances. It is essential however that the area be covered and that the preparation be uniformly absorbed by the skin. The treatment may be repeated once a day or as often as needed.

More than twenty-five tests have been conducted on patients suffering from arthritis is varying degrees of severity. It was observed in the most severally afflicted cases wherein bone tissue damage had occurred, that the pain subsided nearly completely and the associated stiffness and immobility was relieved nearly immediately. Following administration of the preparation, the symptoms did not recur for at least three weeks.

In patients only moderately afflicted wherein the disease had not progressed to bone damage, the pain and inflammation subsided, and in 90 percent of those tested, symptoms did not recur.

The liquid extract is apparently absorbed through the skin and penetrates the joint, thereby reducing the inflammation. The biological mechanism which promotes the therapeutic action of the extract of this invention has not as yet been isolated. Tests have shown that geographical area from which the specimen are collected or the patients selected appears to have no influence on the results from administering the preparation of this invention. It has also been observed that the preparation is effective against external skin irritations and allergic reactions such as poison ivy. Although the active ingredient is as yet unknown, the extract itself has proven to be an excellent all purpose anti-inflammatory agent for topical application.

However, it has been observed that a glass or vitreous container must be used during the extraction process, and the extraction must ocur at or near the temperature of boiling water. A water bath is preferred because uniform heating is necessary to eliminate a need for stirring to avoid burning the specimen.

Annelida are essential to the process. Various attempts have been made to extract a similar medicinal preparation from other lower animal forms with negative results.

In summary, a medicinal preparation extracted from Annelida worms with the Lumbricus family being preferred has herein been described. The extract is prepared by cooking specimen in a sealed glass container in a boiling water bath and subsequently separating this liquid developed from the solid specimen. A few drops of the liquid is applied topically to the surface of an inflamed joint or directed to skin irritation and massaged into the skin.

What is desired to be secured by United States Letters Patent is claimed as follows:

1. A process for preparing an anti-inflammatory medicinal extract from Lumbricus earthworms comprising the steps of: cooking a plurality of said earthworm specimen in a covered glass container at approximately 212° F. for approximately thirty minutes for each quarter pound of said specimen in said container to form a liquid earthworm extract; and removing the cooked specimen from the said liquid extract.

2. The process of claim 1 wherein the glass container of specimen is cooked by placing the said container in a boiling water bath.

3. The anti-inflammatory medicinal extract prepared according to the process of claim 1.

4. The anti-inflammatory medicinal extract prepared according to the process of claim 2.

5. The method of treating patients afflicted with arthritis comprising a topical application to an afflicted area of said patient of an effective amount of the anti-inflammatory medicinal extract prepared according to the process of claim 1.

6. The method of treating patients afflicted with arthritis comprising the topical application to an afflicted area of said patient of an effective amount of the antiinflammatory medicinal extract prepared according to the process of claim 2.

References Cited

Chem. Abst. 33, 1879[3] (1939).

STANLEY, J. FRIEDMAN, Primary Examiner